(12) United States Patent
Zeng et al.

(10) Patent No.: US 12,710,334 B2
(45) Date of Patent: Aug. 18, 2026

(54) METHOD AND APPARATUS FOR GAS LEAK DETECTION

(71) Applicant: ABB SCHWEIZ AG, Baden (CH)

(72) Inventors: Lusha Zeng, Xiamen (CN); Genhuang Zhuang, Xiamen (CN); Baokun Xu, Jinan (CN)

(73) Assignee: ABB SCHWEIZ AG, Baden (CH)

( * ) Notice: Subject to any disclaimer, the term of this patent is extended or adjusted under 35 U.S.C. 154(b) by 301 days.

(21) Appl. No.: 18/644,293

(22) Filed: Apr. 24, 2024

(65) Prior Publication Data

US 2024/0280431 A1 Aug. 22, 2024

Related U.S. Application Data

(63) Continuation of application No. PCT/CN2022/075552, filed on Feb. 8, 2022.

(51) Int. Cl.

*G01M 3/32* (2006.01)
*G01M 3/00* (2006.01)
*H02B 13/025* (2006.01)

(52) U.S. Cl.

CPC .......... *G01M 3/3272* (2013.01); *G01M 3/002* (2013.01); *H02B 13/025* (2013.01)

(58) Field of Classification Search

CPC .. G01M 3/3272; G01M 3/002; H02B 13/025; H02B 13/0655; H01H 33/563
USPC .......................................................... 73/49.3
See application file for complete search history.

(56) References Cited

U.S. PATENT DOCUMENTS

2017/0372857 A1* 12/2017 Vladuchick .......... H01H 33/562

FOREIGN PATENT DOCUMENTS

| | | | | |
|---|---|---|---|---|
| CN | 102104236 A | | 6/2011 | |
| CN | 103063374 A | * | 4/2013 | |
| CN | 103645014 A | | 3/2014 | |
| CN | 112067211 A | | 12/2020 | |
| JP | 2002017010 A | | 1/2002 | |
| JP | 2006311756 A | * | 11/2006 | |
| JP | 2007263584 A | | 10/2007 | |
| WO | 2014180526 A1 | | 11/2014 | |
| WO | WO-2014194958 A1 | * | 12/2014 | ............. G01K 7/427 |
| WO | WO-2016038908 A1 | * | 3/2016 | ........... H02B 13/065 |
| WO | WO-2019003311 A1 | * | 1/2019 | .............. G01M 3/26 |

* cited by examiner

*Primary Examiner* — Marrit Eyassu
(74) *Attorney, Agent, or Firm* — Greenberg Traurig, LLP

(57) ABSTRACT

A method, an apparatus, a computer readable media, and a computer program product for detecting a gas leak of a gas tank. The method includes obtaining a gas pressure within the gas tank and a temperature of a tank body of the gas tank; determining an internal average temperature of the gas tank based on the gas pressure; determining a temperature rise of the tank body relative to an ambient temperature; and determining at least one additional characteristic quantity associated with the temperature rise of the tank body. A gas leak of the gas tank can be detected by using the internal average temperature of the gas tank, the temperature rise of the tank body, and the at least one additional characteristic quantity to obtain a predicted relationship between the internal average temperature of the gas tank and the temperature rise of the tank body.

13 Claims, 6 Drawing Sheets

400A

400C

500A

500B

METHOD AND APPARATUS FOR GAS LEAK DETECTION

CROSS-REFERENCE TO RELATED APPLICATIONS

This is a continuation application claiming priority to international patent application Serial No.: PCT/CN2022/075552, filed on Feb. 8, 2022; which is herein incorporated by reference in its entirety.

FIELD

Example embodiments of the present disclosure generally relate to gas leak detection, and more specifically, to methods, apparatuses, computer readable media, and computer program products for detecting a gas leakage of a gas tank of a Gas Insulated Switchgear (GIS), such that the gas tank as well as the GIS may work in a more safe and effective way.

BACKGROUND

The GIS refers to an electrical system that houses electrical components in one or more sealed gas tanks (such as a circuit breaker chamber or a busbar chamber) filled with an insulating gas (such as the sulfur hexafluoride, abbreviated as SF6). The GIS is widely used in industry fields, for example, the GIS may be deployed in a power supply system to control, protect and isolate electrical components thereby enhancing the reliability of power supply. However, as time elapses, the gas tightness of the gas tank usually deteriorates due to erosion and/or other reasons such as external damages and the like, which leads to a gas leak of the gas tank. When the gas pressure of the gas tank drops down to a certain level, components in the gas tank may lose protections from the insulating gas, and then potential risks may greatly increase in the GIS. Therefore, it is desired to propose an accurate and effective way for detecting the gas leak in the GIS.

SUMMARY

Example embodiments of the present disclosure provide solutions for detecting a gas leak of a gas tank of a GIS.

In a first aspect, example embodiments of the present disclosure provide a method for detecting a gas leak of a gas tank of a Gas Insulated Switchgear, comprising: obtaining a gas pressure within the gas tank and a temperature of a tank body of the gas tank which are collected by a gauge arranged on the tank body at a plurality of time points when the Gas Insulated Switchgear operates in one or more current states; determining, for each of the plurality of time points, an internal average temperature of the gas tank based on the gas pressure and an ideal gas equation; determining, for each of the plurality of time points, a temperature rise of the tank body relative to an ambient temperature based on the temperature of the tank body; determining, for each of the plurality of time points, at least one additional characteristic quantity associated with the temperature rise of the tank body; and fitting the internal average temperature of the gas tank, the temperature rise of the tank body, and the at least one additional characteristic quantity to obtain a predicted relationship between the internal average temperature of the gas tank and the temperature rise of the tank body for detecting the gas leak of the gas tank. With these embodiments, the predicted relationship between the internal average temperature of the gas tank and the temperature rise of the tank body can be obtained. Based on the predicted relationship, the real time temperature rise of the tank body can be converted into the real time internal average temperature of the gas tank. Then, it is able to determine whether the gas leak occurs in the gas tank based on the predicted real time internal average temperature and the real time gas pressure of the gas tank. Since the predicted real time internal average temperature can better reflect the situation inside the gas tank than the real time temperature of the tank body, the gas leak in the GIS can be detected in an accurate and effective way.

In some embodiments, the at least one additional characteristic quantity comprises a first change rate of the temperature rise of the tank body. With these embodiments, the first change rate of the temperature rise of the tank body is considered in determining the predicted relationship between the internal average temperature of the gas tank and the temperature rise of the tank body. In this way, the predicted relationship will be more accurate.

In some embodiments, the temperatures of the tank body collected at a pair of adjacent time points when the Gas Insulated Switchgear operates in each of the current states differ from each other by a predetermined temperature variation. Since the temperature of the tank body may not change significantly in a relatively long time, it is difficult to accurately capture the temperature change at the same time interval. With the above embodiments, the temperatures of the tank body are collected at different time intervals such that the temperatures of the tank body collected at each pair of adjacent time points differ from each other by the same temperature variation. In this way, the temperature change of the tank body can be captured accurately.

In some embodiments, determining the at least one additional characteristic quantity comprises: determining, for each time interval between each pair of adjacent time points when the Gas Insulated Switchgear operates in each of the current states, a quotient of the predetermined temperature variation and the previous time interval between the previous pair of adjacent time points as the first change rate of the temperature rise. With the above embodiments, the temperatures of the tank body are collected at different time intervals such that the temperatures of the tank body collected at each pair of adjacent time points differ from each other by the same temperature variation. In this way, the first change rate of the temperature rise of the tank body can be determined accurately.

In some embodiments, the at least one additional characteristic quantity further comprises a second change rate of the first change rate. With these embodiments, the second change rate of the first change rate is further considered in determining the predicted relationship between the internal average temperature of the gas tank and the temperature rise of the tank body. In this way, the predicted relationship will be more accurate.

In some embodiments, determining the at least one additional characteristic quantity further comprises: determining, for each time interval between each pair of adjacent time points when the Gas Insulated Switchgear operates in each of the current states, a change rate difference between the first change rate in the present time interval and the first change rate in the previous time interval; and determining, for each time interval between each pair of adjacent time points when the Gas Insulated Switchgear operates in each of the current states, a quotient of the change rate difference and the previous time interval as the second change rate of the first change rate. With these embodiments, the second change rate of the first change rate can be determined accurately. In this way, the predicted relationship will be more accurate through considering the temperature rise of the tank body, the first change rate of the temperature rise of the tank body, and the second change rate of the first change rate at the same time.

In some embodiments, the fitting is performed through ridge regression or support vector regression.

In a second aspect, example embodiments of the present disclosure provide a method for detecting a gas leak of a gas tank of a Gas Insulated Switchgear, comprising: obtaining a real time gas pressure within the gas tank and a real time temperature of a tank body of the gas tank which are collected by a gauge arranged on the tank body; determining a real time temperature rise of the tank body relative to an ambient temperature based on the real time temperature of tank body; predicting a real time internal average temperature of the gas tank based on the real time temperature rise and a predicted relationship between an internal average temperature of the gas tank and a temperature rise of the tank body; and determining whether the gas leak occurs in the gas tank based on the predicted real time internal average temperature and the real time gas pressure. With these embodiments, based on the predicted relationship, the real time temperature rise of the tank body can be converted into the real time internal average temperature of the gas tank. Then, it is able to determine whether the gas leak occurs in the gas tank based on the predicted real time internal average temperature and the real time gas pressure of the gas tank. Since the predicted real time internal average temperature can better reflect the situation inside the gas tank than the real time temperature of the tank body, the gas leak in the GIS can be detected in an accurate and effective way.

In some embodiments, determining whether the gas leak occurs in the gas tank comprises: converting the real time gas pressure into a standard gas pressure at a standard temperature based on the predicted real time internal average temperature; and determining, in response to the standard gas pressure being below a pressure threshold, that the gas leak occurs in the gas tank.

In some embodiments, the standard temperature is 20° C.

In a third aspect, example embodiments of the present disclosure provide an apparatus for detecting a gas leak of a gas tank, comprising: a computer processor coupled to a computer-readable memory unit, the memory unit comprising instructions that when executed by the computer processor implements the method according to the first and second aspects.

In a fourth aspect, example embodiments of the present disclosure provide a computer readable medium having instructions stored thereon, the instructions, when executed on at least one processor, cause the at least one processor to perform the method according to the first and second aspects.

In a fifth aspect, example embodiments of the present disclosure provide a computer program product having instructions stored thereon, the instructions, when executed on at least one processor, cause the at least one processor to perform the method according to the first and second aspects.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or similar reference symbols are used to indicate the same or similar elements.

DETAILED DESCRIPTION OF EMBODIMENTS

Figure 1:
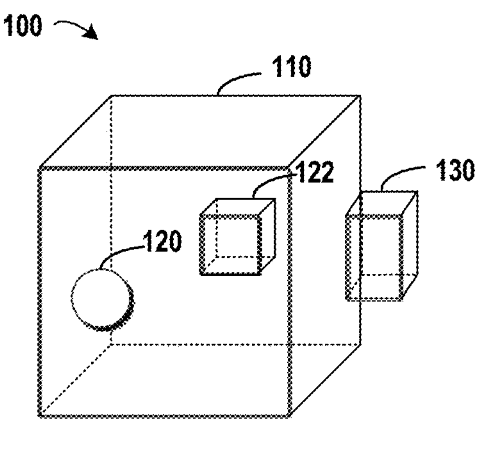
FIG. 1 illustrates a schematic diagram for a gas tank in a GIS in which embodiments of the present disclosure may be implemented.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

For the sake of description, reference will be made to FIG. 1 to provide a general description of an environment of the present disclosure. FIG. 1 illustrates a schematic diagram 100 for a gas tank in a GIS in which embodiments of the present disclosure may be implemented. In FIG. 1, the GIS may include a gas tank 110 (such as a circuit breaker chamber or a busbar chamber) and other devices (not illustrated), where one or more electronical components 120, 122, and the like may be deployed within the gas tank 110. The gas tank 110 may be made of metal materials or other materials, and insulating gas such as $SF_6$ may be filled into the sealed gas tank 110 for protecting the inside electronical components 120 and 122. Here, other types of gas or mixed gas, such as nitrogen or dry air, may be sealed in the gas tank for insulating. However, due to deteriorates and/or other damages may affect the gas tightness of the gas tank 110, whether a gas leak occurs in the gas tank 110 should be detected during operations of the gas tank 110.

As most gas tanks are made of materials that shield wireless signals, further the gas tank 110 does not allow any hole through which a cable may go for transmitting the collected data from the inside to the outside, it is difficult to monitor the temperature of the insulating gas inside the gas tank 110 in a real time during operations of the gas tank 110. Various solutions are provided for detecting the gas leak, for example, a gauge 130 including a temperature sensor and a pressure sensor may be arranged on a tank body of the gas tank 110 to detect the temperature of the tank body and the gas pressure within the gas tank 110 so as to determine whether the gas leak occurs in the gas tank 110 based on the temperature of the tank body and the gas pressure within the gas tank 110. However, since the temperature of the tank body cannot precisely reflect the actual situation of the insulating gas inside gas tank 110, it is unable to reliably determine whether the gas leak occurs in the gas tank 110 based on the temperature of the tank body and the gas pressure within the gas tank 110.

Figure 2:
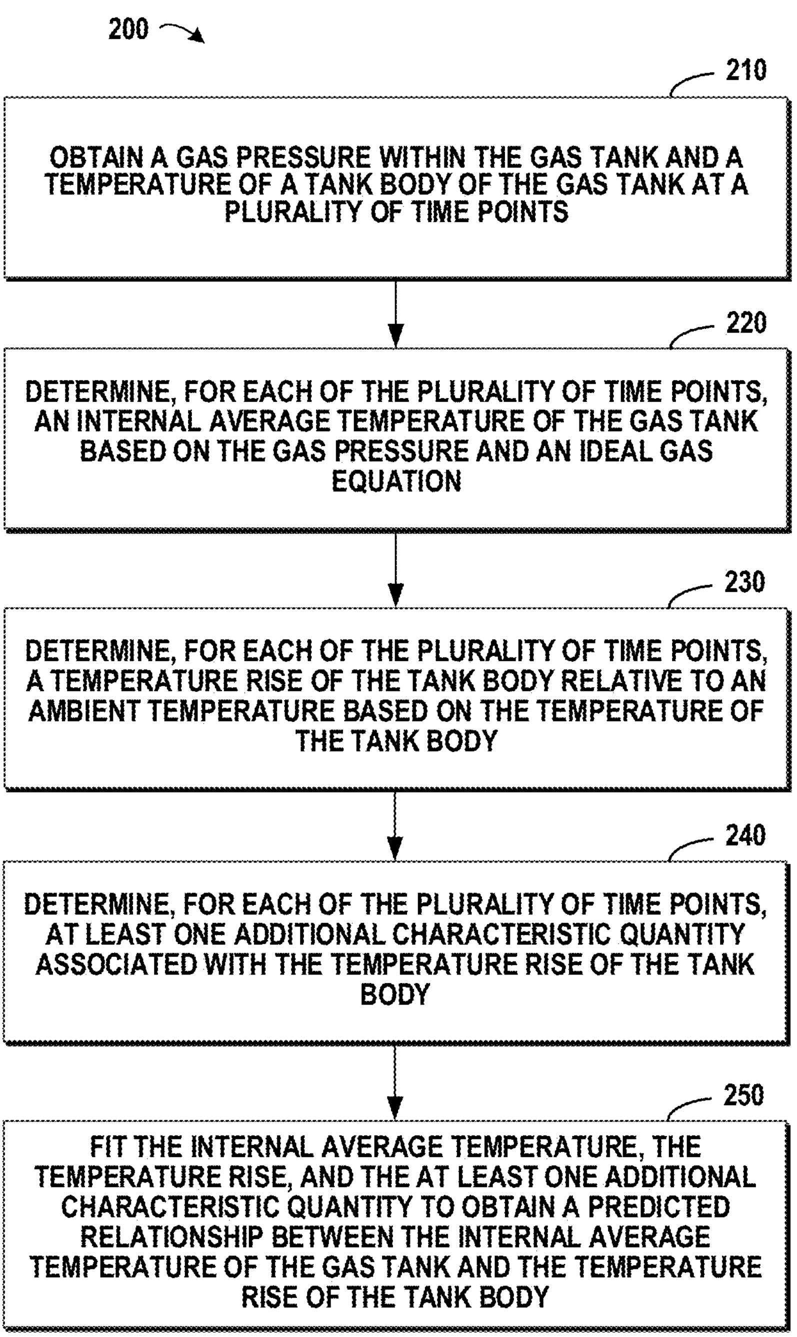
FIG. 2 illustrates a flowchart of a method for detecting a gas leak of a gas tank in accordance with embodiments of the present disclosure.

In order to at least partially solve the above and other potential problems, the present disclosure proposes a new method for detecting a gas leak of a gas tank of a GIS. Reference will be made to FIG. 2 for a general description of the proposed method, where FIG. 2 illustrates a flowchart of a method 200 for detecting a gas leak of a gas tank in accordance with embodiments of the present disclosure. At a block 210, a gas pressure within the gas tank 110 and a temperature of a tank body of the gas tank 110 are obtained. The gas pressure within the gas tank 110 and the temperature of the tank body may be collected by the gauge 130 at a plurality of time points when the GIS operates in one or more current states. In each current state, as the time elapses, the temperature of the gas tank 110 will rise and the gas pressure within the gas tank 10 will change accordingly. Table 1 illustrates different current states of the GIS. As shown in Table 1, the GIS may sequentially operate under the currents of 300A, 1250A, 100A, 600A, 800A, 500A, 1200A, 1000A, 400A, and 100A. Under each current, the GIS will be powered to a stable state. In each current state, as the time elapses, the gauge 130 will collect the gas pressure within the gas tank 110 and the temperature of the tank body. The gas pressure within the gas tank 110 and the temperature of the tank body collected in each current state may be stored as a set of training data. In this way, ten sets of training data will be obtained when the GIS operates in the current states as shown in Table 1.

TABLE 1

| NO. | Current (A) | Remark |
|---|---|---|
| 1 | 300 | to stability |
| 2 | 1250 | to stability |
| 3 | 100 | to stability |
| 4 | 600 | to stability |
| 5 | 800 | to stability |
| 6 | 500 | to stability |
| 7 | 1200 | to stability |
| 8 | 1000 | to stability |
| 9 | 400 | to stability |
| 10 | 100 | to stability |

It is to be understood that in other embodiments, the GIS may operate in more or less current states than those as illustrated in Table 1. With these embodiments, different sets of training data can be obtained for different current states of the GIS. Furthermore, in some embodiments, the temperature of the tank body may be collected by the gauge 130 within a respective predetermined time period, such as 180 minutes, 240 minutes and the like, in each of the current states, instead of waiting for the GIS being powered to the stable state. The scope of the present disclosure is not intended to be limited in this respect.

At a block 220, an internal average temperature of the gas tank 110 is determined based on the gas pressure and an ideal gas equation for each of the plurality of time points. The ideal gas equation is represented by Formula (1):

$$\frac{P}{T_{mean}} = \frac{n}{V}R \qquad \text{Formula (1)}$$

Where P represents the gas pressure within the gas tank 110, $T_{mean}$ (Kelvin) represents the internal average temperature of the gas tank 110, n represents the mole number of the insulating gas (which has a known value from the manufacture of the gas tank 110), V represents a volume of the insulating gas (i.e., a volume of the gas tank 110), and R represents a gas constant for the specific gas. For each of the plurality of time points, the gas pressure P within the gas tank 110 is already obtained at the block 210. Then, the internal average temperature $T_{mean}$ of the gas tank 110 can be calculated with the above ideal gas equation. The internal average temperature $T_{mean}$ of the gas tank 110 better reflects the situation inside the gas tank 110 than the real time temperature of the tank body.

At a block 230, a temperature rise of the tank body relative to an ambient temperature is determined based on the temperature of the tank body for each of the plurality of time points. The temperature rise of the tank body may be determined through calculating a difference between the temperature of the tank body obtained at the block 210 and the ambient temperature.

At a block 240, at least one additional characteristic quantity associated with the temperature rise of the tank body is determined for each of the plurality of time points. In an embodiment, the at least one additional characteristic quantity includes a first change rate of the temperature rise of the tank body. As described above, in each current state, as the time elapses, the temperature of the gas tank 110 will rise. It is beneficial to consider the first change rate of the temperature rise of the tank body in determining a relationship between the internal average temperature of the gas tank 110 and the temperature rise of the tank body. The first change rate reflects how fast the temperature rise of the tank body changes over time.

Figure 3:
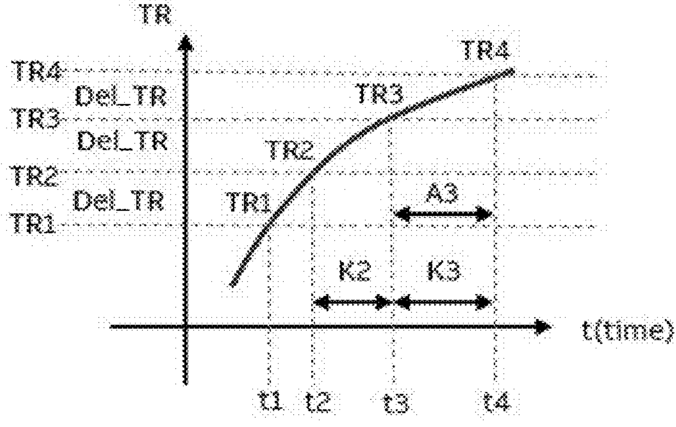
FIG. 3 is a graph illustrating a change of a temperature rise of a tank body over time.

Since the temperature of the tank body may not change significantly in a relatively long time in some current states of the GIS, it is difficult to accurately capture the temperature change at the same time interval. FIG. 3 is a graph illustrating a change of the temperature rise of the tank body over time in one of the current states of the GIS, where a vertical axis represents the temperature rise TR of the tank body and a horizontal axis represents the time t. In some embodiments, as shown in FIG. 3, the temperature rises of the tank body obtained at a pair of adjacent time points differ from each other by a predetermined temperature variation Del_TR. For example, the temperature rise of the tank body at the time point t1 is TR1, the temperature rise of the tank body at the time point t2 is TR2, the temperature rise of the tank body at the time point t3 is TR3, and the temperature rise of the tank body at the time point t4 is TR4. The difference between TR2 and TR1 is Del_TR, the difference between TR3 and TR2 is Del_TR, and the difference between TR4 and TR3 is Del_TR. In other words, the temperatures of the tank body collected at each pair of adjacent time points differ from each other by the predetermined temperature variation Del_TR. When the temperature rise of the tank body is changed by the predetermined temperature variation Del_TR in each current state, the respective time point will be recorded. For example, when the temperature rise of the tank body is changed from TR1 to TR2, the time point t2 will be recorded. When the temperature rise of the tank body is further changed from TR2 to TR3, the time point t3 will be recorded. Similarly, the time point t4 and other time points will be recorded each time the temperature rise of the tank body is changed by the predetermined temperature variation Del_TR.

In some embodiments, the predetermined temperature variation Del_TR is 0.2K. In some embodiments, the predetermined temperature variation Del_TR is 0.5K. In other embodiments, the predetermined temperature variation Del_TR may be of other values. The scope of the present disclosure is not intended to be limited in this respect.

In some embodiments, for each time interval between each pair of adjacent time points, the first change rate of the temperature rise is determined by calculating a quotient of the predetermined temperature variation Del_TR and the previous time interval between the previous pair of adjacent time points. For example, as shown in FIG. 3, for the time interval between the time points t2 and t3, the first change rate K2 of the temperature rise of the tank body may be represented as K2=Del_TR/(t2−t1). For the time interval between the time points t3 and t4, the first change rate K3 of the temperature rise of the tank body may be represented as K3=Del_TR/(t3−t2). Similarly, for each time interval between other pairs of adjacent time points, a quotient of the predetermined temperature variation Del_TR and the previous time interval between the previous pair of adjacent time points may be calculated as the first change rate of the temperature rise.

In some embodiments, the at least one additional characteristic quantity further includes a second change rate of the first change rate. The second change rate reflects how fast the first change rate changes over time. It is beneficial to consider the second change rate of the first change rate in determining the relationship between the internal average temperature of the gas tank 110 and the temperature rise of the tank body. The second change rate of the first change rate may be determined through using the following steps: determining, for each time interval between each pair of adjacent time points when the GIS operates in each of the current states, a change rate difference between the first change rate in the present time interval and the first change rate in the previous time interval; and determining, for each time interval between each pair of adjacent time points when the GIS operates in each of the current states, a quotient of the change rate difference and the previous time interval as the second change rate of the first change rate.

For example, as shown in FIG. 3, for the time interval between the time point t3 and the time point t4, the second change rate of the first change rate is represented by A3 which may be determined by the following steps. First, the change rate difference between the first change rate K3 in the present time interval and the first change rate K2 in the previous time interval is calculated as K3-K2. Then, a quotient of the change rate difference K3-K2 and the previous time interval t3−t2 is determined as the second change rate A3 of the first change rate for the time interval from the time point t3 to the time point t4. Similarly, for each time interval between other pairs of adjacent time points, the second change rate of the first change rate may be determined through dividing the difference between the first change rate in the present time interval and the first change rate in the previous time interval by the previous time interval.

Returning back to FIG. 2, at a block 250, the internal average temperature $T_{mean}$ of the gas tank 110, the temperature rise TR of the tank body, and the at least one additional characteristic quantity (such as the first change rate and/or the second change rate) are fitted to obtain a predicted relationship between the internal average temperature of the gas tank 110 and the temperature rise of the tank body. In some embodiments, the fitting is performed through ridge regression or support vector regression (SVR). In other embodiments, the fitting may be performed in other manners. The scope of the present disclosure is not intended to be limited in this respect. Based on the predicted relationship, the real time temperature rise of the tank body can be converted into the real time internal average temperature of the gas tank 110. Then, it is able to determine whether the gas leak occurs in the gas tank 110 based on the predicted real time internal average temperature and the real time gas pressure of the gas tank 110. Since the predicted real time internal average temperature can better reflect the situation inside the gas tank 110 than the real time temperature of the tank body, the gas leak in the GIS can be detected in an accurate and effective way.

On the basis that the predicted relationship between the internal average temperature of the gas tank 110 and the temperature rise of the tank body is obtained, it is able to determine whether the gas leak occurs in the gas tank 110 in a more reliable way. Specifically, in a first step, a real time gas pressure within the gas tank 110 and a real time temperature of the tank body which are collected by the gauge 130 are obtained. In a second step, a real time temperature rise of the tank body relative to the ambient temperature is determined based on the real time temperature of tank body. In a third step, a real time internal average temperature of the gas tank 110 can be predicted based on the real time temperature rise and the predicted relationship. In a fourth step, whether the gas leak occurs in the gas tank can be determined based on the predicted real time internal average temperature and the real time gas pressure.

In some embodiments, determining whether the gas leak occurs in the gas tank 110 comprises: converting the real time gas pressure into a standard gas pressure at a standard temperature based on the predicted real time internal average temperature; and determining, in response to the standard gas pressure being below a pressure threshold, that the gas leak occurs in the gas tank 110. With these embodiments, the real time gas pressure may be converted into a standard situation for further processing. In an embodiment, a standard temperature 20° C. may be taken as the standard situation, here the gas pressure under the standard situation is represented as $P_{20}$.

In some embodiments, the standard gas pressure may be determined based on an association between the mole number of the gas included in the gas tank 110 and the gas temperature (such as the predicted real time internal average temperature). Specifically, the following Formulas (2) and (3) exist:

$$\frac{P}{T_c} = \frac{n}{V}R \quad \text{Formula (2)}$$

Where P represents the real time gas pressure within the gas tank 110, $T_c$ (Kelvin) represents the predicted real time internal average temperature within the gas tank 110, n represents the mole number of the gas (which has a known value from the manufacture of the gas tank), V represents a volume of the gas (i.e., a volume of the gas tank), and R represents a gas constant for the specific gas. As n/v represents the gas density equivalence, the above Formula (2) may be converted to the following Formula (3):

$$P_{20} = \frac{P}{T_c} * (273 + 20) \quad \text{Formula (3)}$$

Where $P_{20}$ represents a gas pressure with a certain gas density equivalence under 20° C. (represented as 273+20 K in the Kelvin degree). Therefore, based on the real time gas pressure P and the predicted real time internal average temperature $T_c$ within the gas tank 110, the standard gas pressure under 20° C. may be determined from Formula (3). It is to be understood that in other embodiments, the standard temperature may be of other values. The scope of the present disclosure is not intended to be limited in this respect.

Then, the gas leak of the gas tank 110 may be determined based on the gas pressure $P_{20}$. Here, if the gas tank 110 is sealed and in a good condition, then the gas pressure $P_{20}$ may remain to an approximate constant value. If the gas tank 110 leaks, then the gas pressure $P_{20}$ may drop. In some embodiments of the present disclosure, the gas pressure $P_{20}$ may be monitored at specific time point and/or in a continuously way. For example, the gas leak may be detected when the gas pressure $P_{20}$ being below a pressure threshold.

Table 2 illustrates some current states of the GIS. As shown in Table 2, the GIS may sequentially operate under the currents of 200A, 400A, 700A, 900A, 1250A, 900A, 700A, 300A, 900A, 700A, 500A, 1000A, and 1250A. Under each current, the GIS will be powered to a stable state or within a predetermined time period, such as 120 minutes.

TABLE 2

| NO. | Current (A) | Remark |
|---|---|---|
| 1 | 200 | for 120 min |
| 2 | 400 | for 120 min |
| 3 | 700 | for 120 min |
| 4 | 900 | to stabiltiy |
| 5 | 1250 | for 120 min |
| 6 | 900 | for 120 min |
| 7 | 700 | for 120 min |
| 8 | 300 | for 120 min |
| 9 | 900 | to stabiltiy |
| 10 | 700 | for 120 min |
| 11 | 500 | for 120 min |
| 12 | 1000 | for 120 min |
| 13 | 1250 | for 120 min |

In each current state, as the time elapses, the gauge 130 will collect the gas pressure within the gas tank 110 and the temperature of the tank body. The gas pressure within the gas tank 110 and the temperature of the tank body collected in each current state as shown in Table 2 may be stored as a set of testing data. With the set of testing data, the internal average temperature rise of the gas tank 110 can be predicted and the gas pressure $P_{20}$ can be determined accordingly.

Figure 4A:
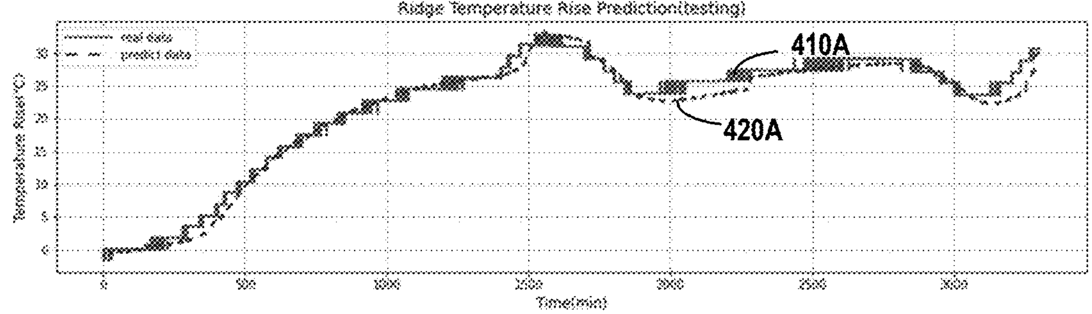
FIG. 4A illustrates a schematic diagram for a comparison between a predicted internal average temperature rise and a calculated internal average temperature rise when the predicted relationship is obtained through ridge regression in accordance with embodiments of the present disclosure.

FIG. 4A illustrates a schematic diagram 400A for a comparison between a predicted internal average temperature rise and a calculated internal average temperature rise when the predicted relationship is obtained through the ridge regression in accordance with embodiments of the present disclosure. In FIG. 4A, a curve 420A indicates the predicted internal average temperature rise that is predicted based on the set of testing data obtained in the current states as shown in Table 2 according to the embodiments of the present disclosure, and a curve 410A indicates the calculated internal average temperature rise in the test. It is seen that amplitudes for the curves 410A and 420A are close to each other, and then it proves that the proposed method 200 greatly improves the accuracy for determining the internal average temperature of the gas tank 110.

Figure 4B:
FIG. 4B illustrates a schematic diagram for a comparison between a predicted internal average temperature rise and a calculated internal average temperature rise when the predicted relationship is obtained through support vector regression in accordance with embodiments of the present disclosure.
Figure 4B:
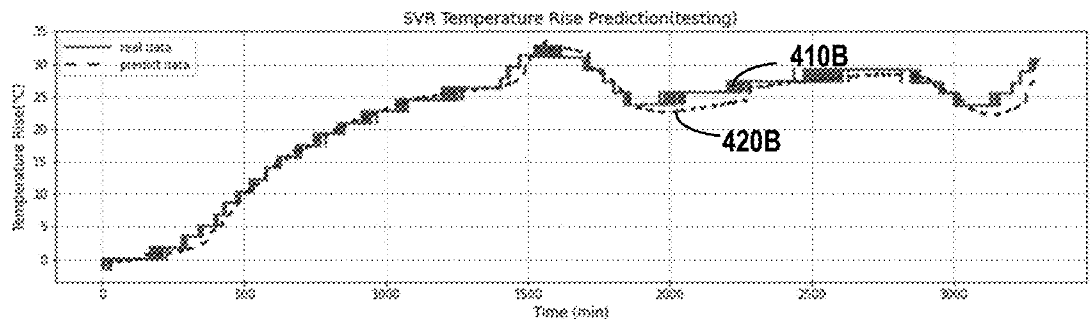

FIG. 4B illustrates a schematic diagram 400B for a comparison between a predicted internal average temperature rise and a calculated internal average temperature rise when the predicted relationship is obtained through support vector regression (SVR) in accordance with embodiments of the present disclosure. In FIG. 4B, a curve 420B indicates the predicted internal average temperature rise that is predicted based on the set of testing data obtained in the current states as shown in Table 2 according to the embodiments of the present disclosure, and a curve 410B indicates the calculated internal average temperature rise in the test. It is seen that amplitudes for the curves 410B and 420B are close to each other, and then it proves that the proposed method 200 greatly improves the accuracy for determining the internal average temperature of the gas tank 110.

Figure 4C:
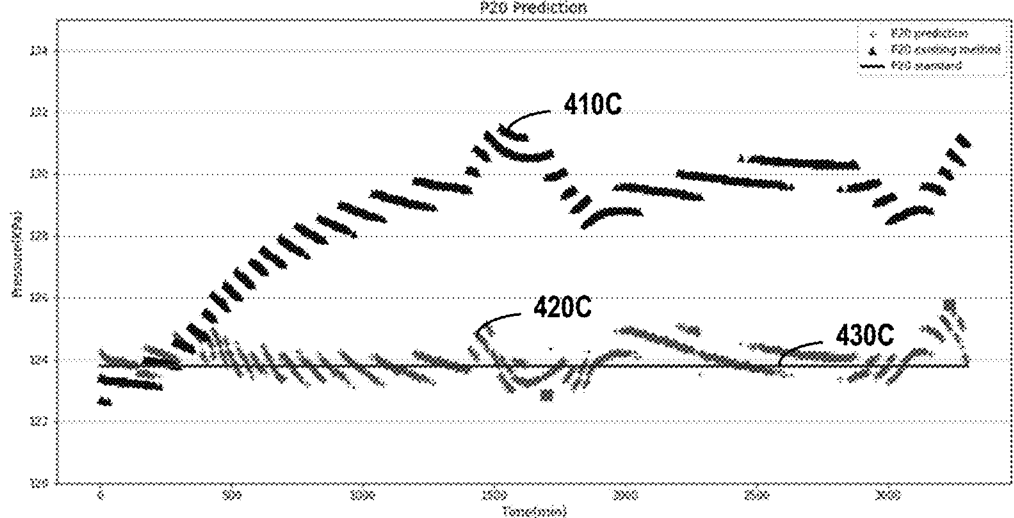
FIG. 4C illustrates a schematic diagram for an estimated gas pressure in accordance with embodiments of the present disclosure.

FIG. 4C illustrates a schematic diagram 400C for an estimated gas pressure in accordance with embodiments of the present disclosure, where the horizontal axis represents the time, and the vertical axis represents the gas pressure. In FIG. 4C, a curve 410C indicates the $P_{20}$ gas pressure from existing method, a curve 420C indicates the $P_{20}$ gas pressure that is calculated according to the method 200, and a line 430C indicates the value of $P_{20}$ gas pressure when the gas tank 110 is in a normal state. Although the curve 420C includes some waves near the line 430C, the curve 420C is much closer to the normal line 430C when compared with the curve 410C. Therefore, the method 200 provides an accurate estimation of the gas pressure inside the gas tank 110.

Table 3 illustrates some current states of the GIS. As shown in Table 3, the GIS may sequentially operate under the currents of 400A, 1250A, 250A, 1250A, 600A, 300A, 1100A, 900A, 700A, 500A, 300A, 600A, 800A, 1000A, 1250A, and 500A. Under each current, the GIS will be powered to a stable state or within a predetermined time period, such as 240 minutes or 180 minutes.

TABLE 3

| NO. | Current (A) | Remark |
|---|---|---|
| 1 | 400 | to stabiltiy |
| 2 | 1250 | to stabiltiy |
| 3 | 250 | to stabiltiy |
| 4 | 1250 | for 180 min |
| 5 | 600 | for 180 min |
| 6 | 300 | to stabiltiy |
| 7 | 1100 | for 240 min |
| 8 | 900 | for 240 min |
| 9 | 700 | for 240 min |
| 10 | 500 | to stabiltiy |

TABLE 3-continued

| NO. | Current (A) | Remark |
|---|---|---|
| 11 | 300 | for 180 min |
| 12 | 600 | for 180 min |
| 13 | 800 | to stabiltiy |
| 14 | 1000 | for 180 min |
| 15 | 1250 | to stabiltiy |
| 16 | 500 | for 240 min |

In each current state, as the time elapses, the gauge 130 will collect the gas pressure within the gas tank 110 and the temperature of the tank body. The gas pressure within the gas tank 110 and the temperature of the tank body collected in each current state as shown in Table 3 may be stored as a set of testing data. With the set of testing data, the internal average temperature rise of the gas tank 110 can be predicted and the gas pressure $P_{20}$ can be determined accordingly.

Figure 5A:
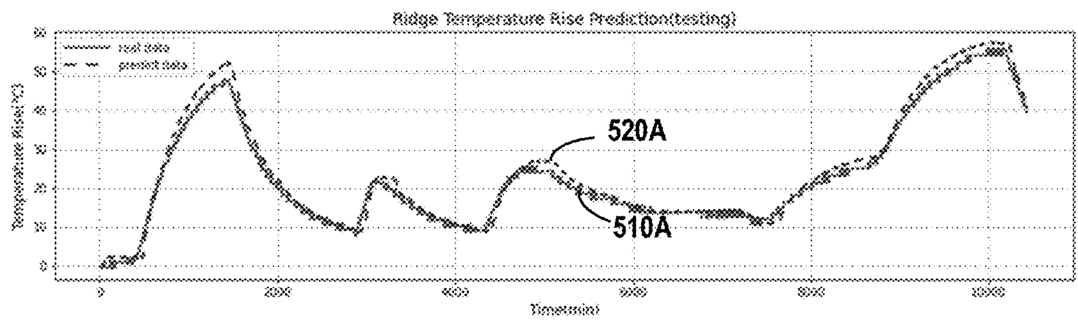
FIG. 5A illustrates a schematic diagram for a comparison between a predicted internal average temperature rise and a calculated internal average temperature rise when the predicted relationship is obtained through ridge regression in accordance with embodiments of the present disclosure.

FIG. 5A illustrates a schematic diagram 500A for a comparison between a predicted internal average temperature rise and a calculated internal average temperature rise when the predicted relationship is obtained through the ridge regression in accordance with embodiments of the present disclosure. In FIG. 5A, a curve 520A indicates the predicted internal average temperature rise that is predicted based on the set of testing data obtained in the current states as shown in Table 3 according to the embodiments of the present disclosure, and a curve 510A indicates the calculated internal average temperature rise in the test. It is seen that amplitudes for the curves 510A and 520A are close to each other, and then it proves that the proposed method 200 greatly improves the accuracy for determining the internal average temperature of the gas tank 110.

Figure 5B:
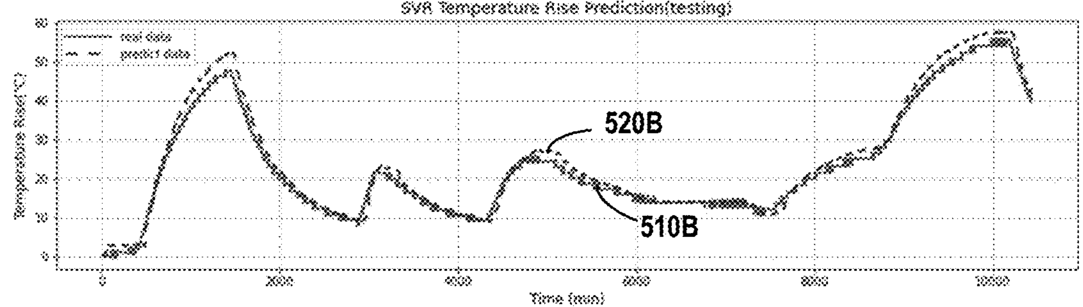
FIG. 5B illustrates a schematic diagram for a comparison between a predicted internal average temperature rise and a calculated internal average temperature rise when the predicted relationship is obtained through support vector regression in accordance with embodiments of the present disclosure.

FIG. 5B illustrates a schematic diagram 500B for a comparison between a predicted internal average temperature rise and a calculated internal average temperature rise when the predicted relationship is obtained through support vector regression (SVR) in accordance with embodiments of the present disclosure. In FIG. 5B, a curve 520B indicates the predicted internal average temperature rise that is predicted based on the set of testing data obtained in the current states as shown in Table 3 according to the embodiments of the present disclosure, and a curve 510B indicates the calculated internal average temperature rise in the test. It is seen that amplitudes for the curves 510B and 520B are close to each other, and then it proves that the proposed method 200 greatly improves the accuracy for determining the internal average temperature of the gas tank 110.

Figure 5C:
FIG. 5C illustrates a schematic diagram for an estimated gas pressure in accordance with embodiments of the present disclosure.
Figure 5C:
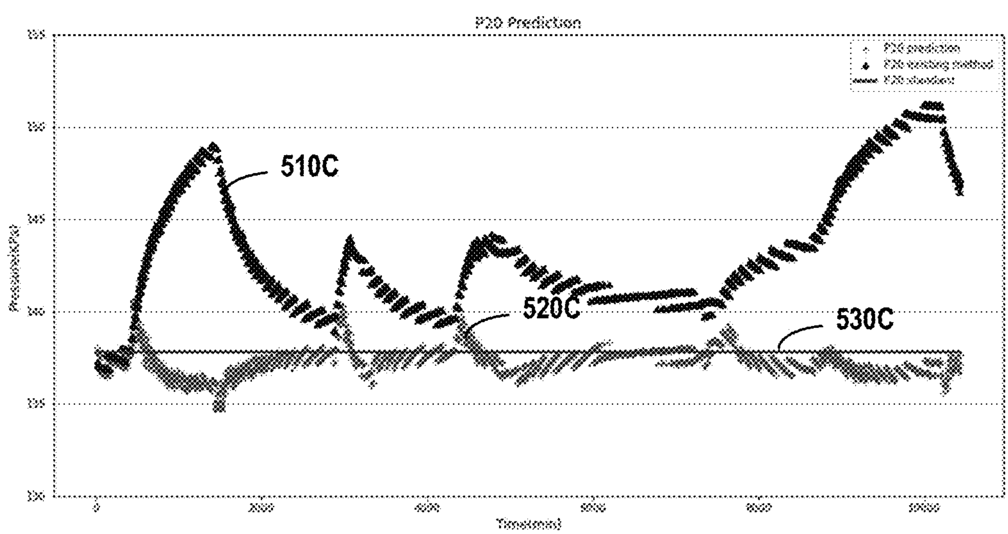

FIG. 5C illustrates a schematic diagram 500C for an estimated gas pressure in accordance with embodiments of the present disclosure, where the horizontal axis represents the time, and the vertical axis represents the gas pressure. In FIG. 5C, a curve 510C indicates the $P_{20}$ gas pressure from existing method, a curve 520C indicates the $P_{20}$ gas pressure that is calculated according to the method 200, and a line 530C indicates the value of $P_{20}$ gas pressure when the gas tank 110 is in a normal state. Although the curve 520C includes some waves near the line 530C, the curve 520C is much closer to the normal line 530C when compared with the curve 510C. Therefore, the method 200 provides an accurate estimation of the gas pressure inside the gas tank 110.

According to embodiments of the present disclosure, based on the predicted relationship, the real time temperature rise of the tank body can be converted into the real time internal average temperature of the gas tank. Then, it is able to determine whether the gas leak occurs in the gas tank based on the predicted real time internal average temperature and the real time gas pressure of the gas tank. Since the predicted real time internal average temperature can better reflect the situation inside the gas tank than the real time temperature of the tank body, the gas leak in the GIS can be detected in an accurate and effective way.

Figure 6:
FIG. 6 illustrates a schematic diagram of a system for detecting a gas leak of a gas tank in accordance with embodiments of the present disclosure.
Figure 6:
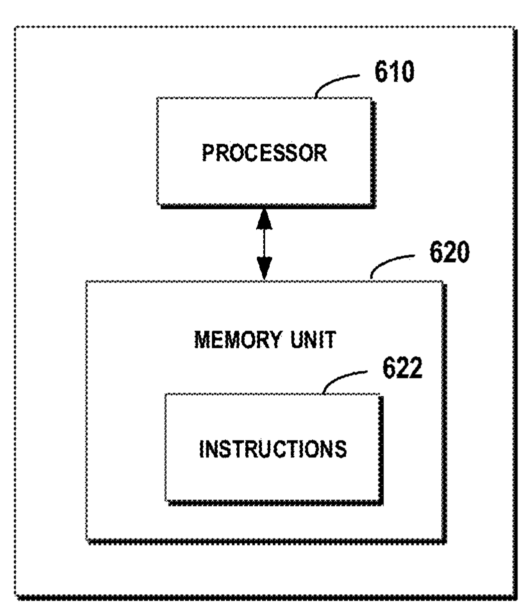

In some embodiments of the present disclosure, an apparatus 600 is provided for detecting a gas leak of a gas tank. FIG. 6 illustrates a schematic diagram of an apparatus 600 for detecting a gas leak of a gas tank in accordance with embodiments of the present disclosure. As illustrated in FIG. 6, the apparatus 600 may comprise a computer processor 610 coupled to a computer-readable memory unit 620, and the memory unit 620 comprises instructions 622. When executed by the computer processor 610, the instructions 622 may implement the method 200 for detecting the gas leak of the gas tank as described in the preceding paragraphs, and details will be omitted hereinafter.

In some embodiments of the present disclosure, a computer readable medium for detecting a gas leak of a gas tank is provided. The computer readable medium has instructions stored thereon, and the instructions, when executed on at least one processor, may cause at least one processor to perform the method for detecting a gas leak of a gas tank as described in the preceding paragraphs, and details will be omitted hereinafter.

In some embodiments of the present disclosure, a computer program product is provided for detecting a gas leak of a gas tank. The computer readable medium has instructions stored thereon, and the instructions, when executed on at least one processor, may cause at least one processor to perform the method for detecting a gas leak of a gas tank as described in the preceding paragraphs, and details will be omitted hereinafter.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 3. Generally, program modules include routines, programs, libraries, objects, classes, components, data structures, or the like that perform particular tasks or implement particular abstract data types. The functionality of the program modules may be combined or split between program modules as ideal in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for detecting a gas leak of a gas tank of a Gas Insulated Switchgear, comprising:

obtaining a gas pressure within the gas tank and a temperature of a tank body of the gas tank which are collected by a gauge arranged on the tank body at a plurality of time points when the Gas Insulated Switchgear operates in one or more current states;

determining, for each of the plurality of time points, an internal average temperature of the gas tank based on the gas pressure and an ideal gas equation;

determining, for each of the plurality of time points, a temperature rise of the tank body relative to an ambient temperature based on the temperature of the tank body;

determining, for each of the plurality of time points, at least one additional characteristic quantity associated with the temperature rise of the tank body; and fitting the internal average temperature of the gas tank, the temperature rise of the tank body, and the at least one additional characteristic quantity to obtain a predicted relationship between the internal average temperature of the gas tank and the temperature rise of the tank body for detecting the gas leak of the gas tank.

2. The method of claim 1, wherein the at least one additional characteristic quantity comprises a first change rate of the temperature rise of the tank body.

3. The method of claim 2, wherein the temperatures of the tank body collected at a pair of adjacent time points when the Gas Insulated Switchgear operates in each of the current states differ from each other by a predetermined temperature variation.

4. The method of claim 3, wherein determining the at least one additional characteristic quantity comprises:

determining, for each time interval between each pair of adjacent time points when the Gas Insulated Switchgear operates in each of the current states, a quotient of the predetermined temperature variation and the previous time interval between the previous pair of adjacent time points as the first change rate of the temperature rise.

5. The method of claim 2, wherein the at least one additional characteristic quantity further comprises a second change rate of the first change rate.

6. The method of claim 5, wherein determining the at least one additional characteristic quantity further comprises:

determining, for each time interval between each pair of adjacent time points when the Gas Insulated Switchgear operates in each of the current states, a change rate difference between the first change rate in the present time interval and the first change rate in the previous time interval; and determining, for each time interval between each pair of adjacent time points when the Gas Insulated Switchgear operates in each of the current states, a quotient of the change rate difference and the previous time interval as the second change rate of the first change rate.

7. The method of claim 1, wherein the fitting is performed through ridge regression or support vector regression.

8. An apparatus for detecting a gas leak of a gas tank, comprising:

a computer processor coupled to a computer-readable memory unit, the memory unit comprising instructions that when executed by the computer processor implements the method according to claim 1.

9. A computer readable medium having instructions stored thereon, the instructions, when executed on at least one processor, cause the at least one processor to perform the method according to claim 1.

10. A computer program product having instructions stored thereon, the instructions, when executed on at least one processor, cause the at least one processor to perform the method according to claim 1.

11. A method for detecting a gas leak of a gas tank of a Gas Insulated Switchgear, comprising:

obtaining a real time gas pressure within the gas tank and a real time temperature of a tank body of the gas tank which are collected by a gauge arranged on the tank body;

determining a real time temperature rise of the tank body relative to an ambient temperature based on the real time temperature of tank body;

predicting a real time internal average temperature of the gas tank based on the real time temperature rise and a predicted relationship between an internal average temperature of the gas tank and a temperature rise of the tank body; and determining whether the gas leak occurs in the gas tank based on the predicted real time internal average temperature and the real time gas pressure.

12. The method of claim 11, wherein determining whether the gas leak occurs in the gas tank comprises:

converting the real time gas pressure into a standard gas pressure at a standard temperature based on the predicted real time internal average temperature; and determining, in response to the standard gas pressure being below a pressure threshold, that the gas leak occurs in the gas tank.

13. The method of claim 11, wherein the standard temperature is 20° C.

* * * * *